(No Model.) 4 Sheets—Sheet 2.
W. J. GORDON.
MACHINE FOR SEAMING METALLIC CANS.
No. 303,837. Patented Aug. 19, 1884.
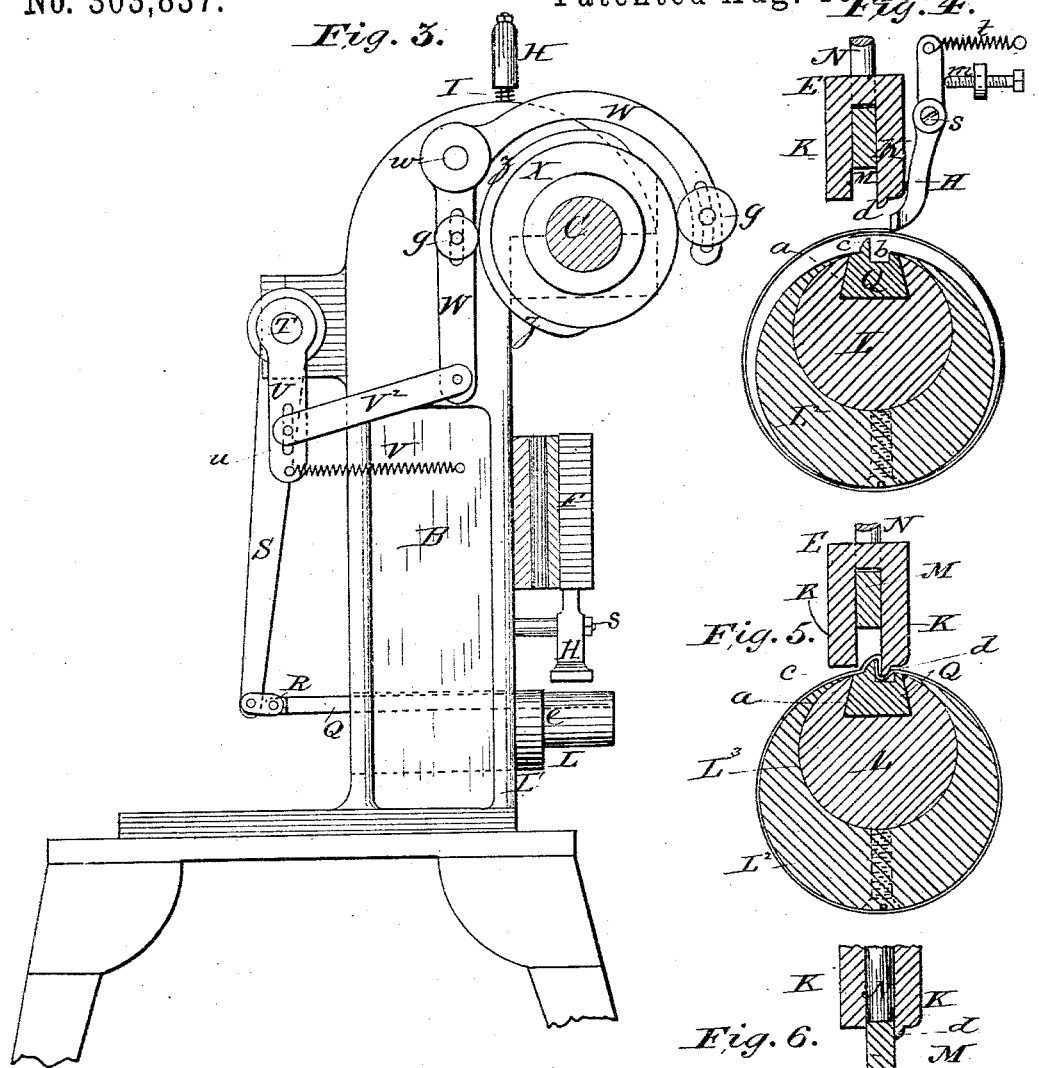
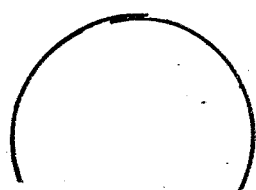
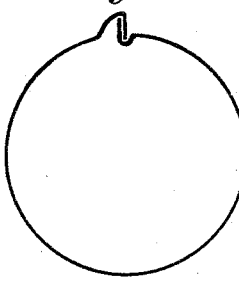
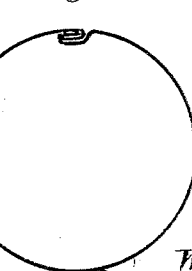
Witnesses:
T. C. Brecht
Lutie Norris
Inventor:
Wm. J. Gordon,
By Johnson & Johnson
Attorneys.
N. PETERS, Photo-Lithographer, Washington, D. C.

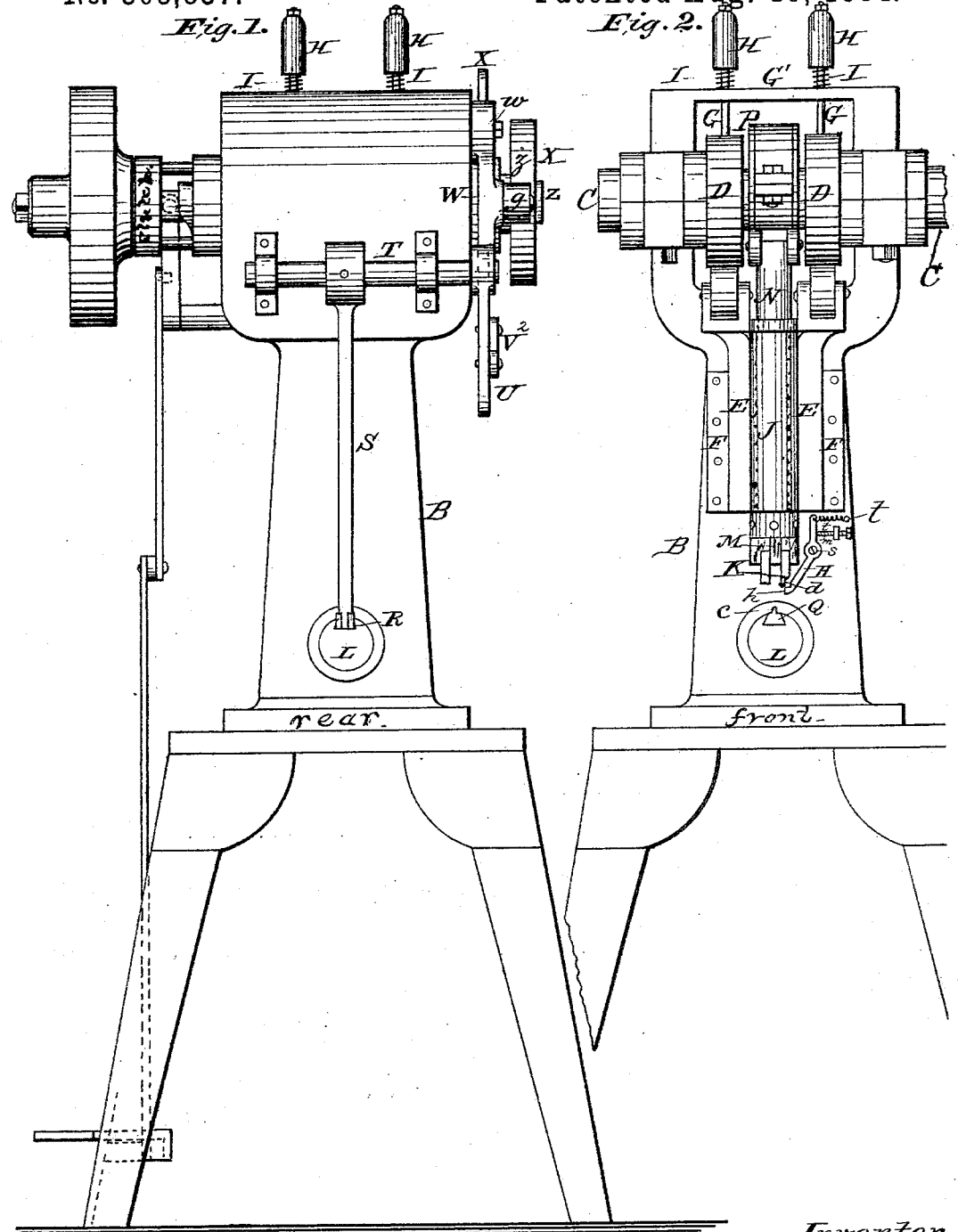

(No Model.) 4 Sheets—Sheet 3.
W. J. GORDON.
MACHINE FOR SEAMING METALLIC CANS.
No. 303,837. Patented Aug. 19, 1884.
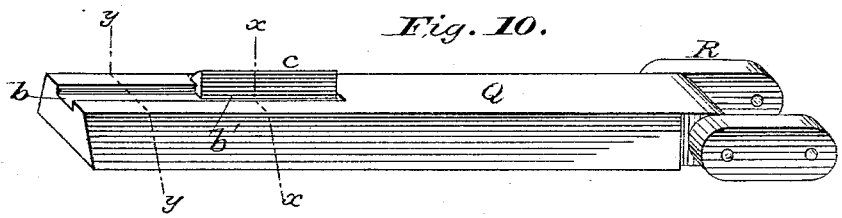
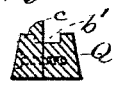
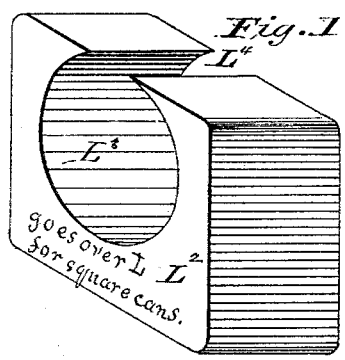
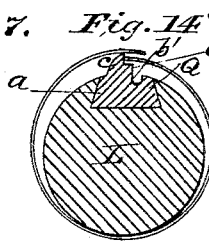
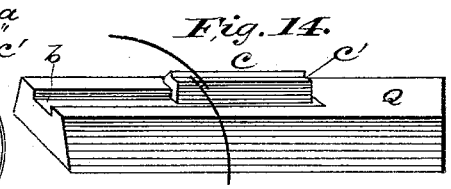
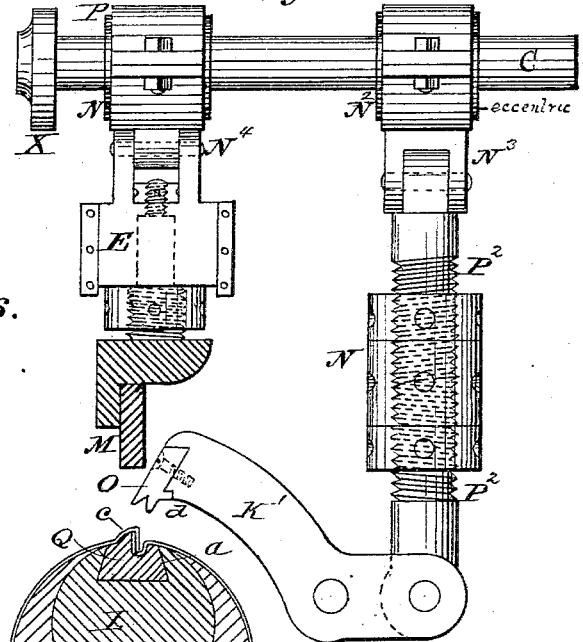
Witnesses:
T. C. Brecht
Lutie Torris.
Inventor:
Wm. J. Gordon,
By Johnson and Johnson
Attorneys.
N. PETERS. Photo-Lithographer. Washington, D. C.

(No Model.) 4 Sheets—Sheet 4.

W. J. GORDON.
MACHINE FOR SEAMING METALLIC CANS.

No. 303,837. Patented Aug. 19, 1884.

Witnesses:
F. C. Brecht
Lytti Norris

Inventor:
Wm. J. Gordon,
Johnson & Johnson
Attorneys.

UNITED STATES PATENT OFFICE.

WILLIAM JAMES GORDON, OF PHILADELPHIA, PENNSYLVANIA, ASSIGNOR OF ONE-HALF TO EDMUND D. GILBERT, OF SAME PLACE.

MACHINE FOR SEAMING METALLIC CANS.

SPECIFICATION forming part of Letters Patent No. 303,837, dated August 19, 1884.

Application filed February 19, 1884. (No model.)

*To all whom it may concern:*

Be it known that I, WILLIAM JAMES GORDON, a citizen of the United States, residing at the city and county of Philadelphia, and State of Pennsylvania, have invented new and useful Improvements in Machines for Seaming Metallic Cans, &c., of which the following is a specification.

In a patent granted to me December 16, 1879, No. 222,691, for seaming-machine, I have described and claimed certain mechanism for forming the seam in can-bodies, having as co-operating elements a can-holder, a die carried thereby, upon and over which the overlapped ends of the can-body are crimped, clamping die-jaws to clamp and crimp the seam over and upon the lower die, and a plunger to compress the crimped metal into a seam, the clamping die-jaws being adapted to ascend after the seam has been crimped to allow the plunger to turn the crimp to one side and compress it into a groove in the holder.

My present improvements relate particularly to my said patented seaming-machine, and are designed to render said machine more effective in the operation of forming the seam; to increase the capacity of the machine for seaming different-sized can-bodies, and to utilize a reciprocating die-carrier of the can-holder as the means for ejecting the seamed can-body from said holder.

Figure 18:
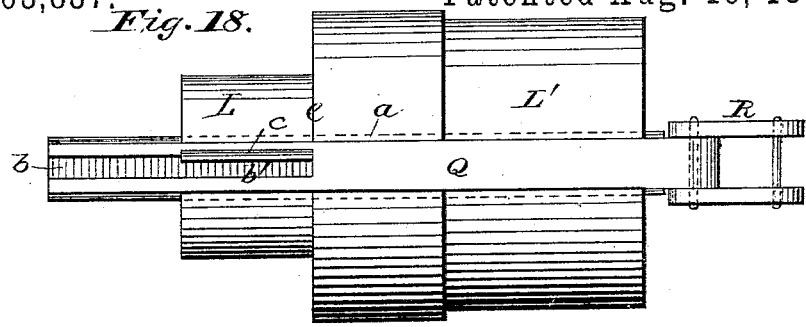
Figure 19:
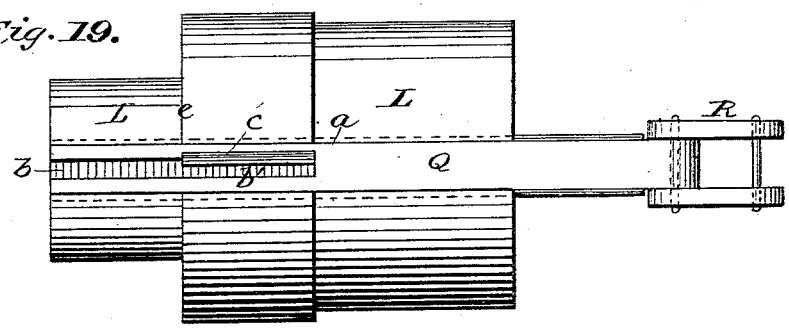
Figure 20:
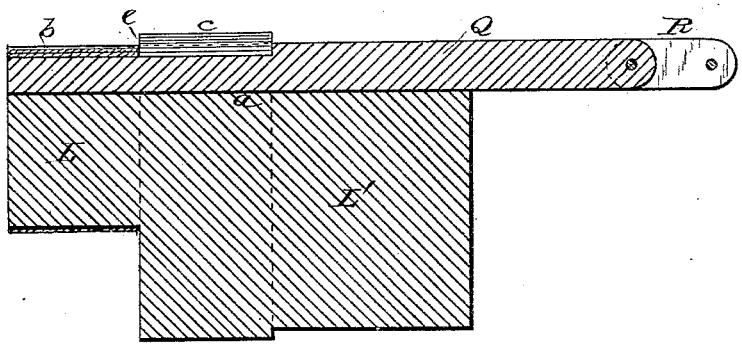
Figure 21:
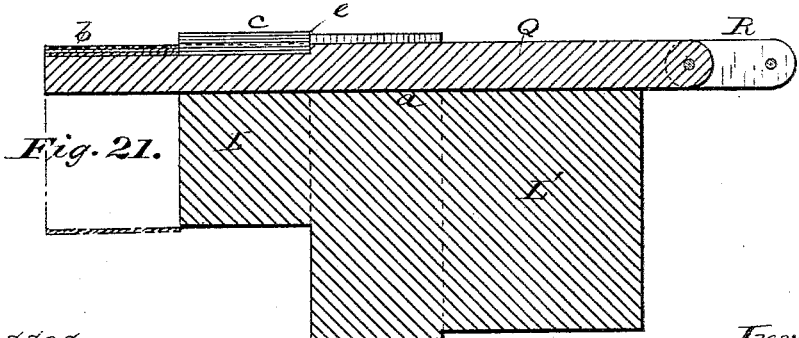

Referring to the accompanying drawings, Figure 1 represents an elevation of the rear side of a seaming-press embracing my improvements; Fig. 2, a front elevation, and Fig. 3 a side view, of the same; Fig. 4, a sectional view showing the forming-dies in the positions they occupy in the first step of the operation of forming the seam; Fig. 5, a similar view showing the forming-dies closed in the second step of forming the seam; Fig. 6, a similar view showing the completion of the seam by the plunger or hammer. Figs. 7, 8, and 9 show, respectively, cross-sections of the can-body, illustrating the steps in forming the seam; Fig. 10, a view in perspective of the sliding die-carrier of the can-holder, showing the die and the groove in its carrier extending from the die, in line therewith, to the end of said carrier; Fig. 11, a cross-section on the line $x\,x$, and Fig. 12 cross-section on the line $y\,y$, of Fig. 10; and Fig. 13 shows the die detached from its carrier. Figs. 14 and 14$^a$ show the sliding die-carrier with a modified form of die, and a cross-section of the same with can-holder. Fig. 15 represents a modification in which the upper forming-die is carried by a lever. Fig. 16 shows the die-carrying lever. Fig. 17 shows a can-holder used in seaming square cans. Fig. 18 represents a top view of the can-holder, showing the die-carrier at the limit of its forward movement, with the die in position to receive the can-blank; Fig. 19, a similar view showing the die-carrier at the limit of its inward movement to withdraw the die from beneath and free the crimped seam and bring the groove $b$ in the carrier beneath said seam; and Fig. 20, a vertical section showing the die-carrier in the position it occupies in Fig. 19. Fig. 21 shows the die-carrier as having ejected the seamed can.

The operating mechanism of the machine is supported upon a table-stand by a suitable standard, B, at the top and front side of which the driving-shaft C is mounted. The upper dies or clamping-jaws, K K, are carried by the vertical slide or frame E, fitted to move vertically in guides F F, and the plunger or hammer M is carried by a stem, N, which moves in a sleeve, J, of the slide E, and is connected with and operated by an eccentric, P, on the shaft. The upper die-carrying slide is depressed by the cams D D, acting upon rollers of said slide, the upward or return movement of the latter being effected by the return-bars G G, connected with said slide, the springs I I, and caps H H, which inclose said springs and compress them against the cross-bar G', so that the slide E is raised by the expansive force of the springs after the cams have depressed it, as shown and described in my said patent. The lower die is carried by the can-body holder L, which projects horizontally from the front of the standard B, just beneath and in proper relation to the upper dies or clamping-jaws and hammer. As these operating parts, with the treadle-clutch connection, are arranged and operate in the same manner as the corresponding parts of the seaming-machine patented to me as aforesaid, a more particular description thereof is deemed unnecessary herein, as my present improvements are directed to a novel construction of the seam-forming dies and to matters of combinations which will be made the subject of specific claim. The clamping-jaws K K serve as the upper dies in the operation of forming the proper crimp for the seam. They project from the lower end of the slide E, with a space between them to receive the plunger or hammer M, by which the crimped seam is pressed down or flattened, as in my said patent. One of these jaws is formed with a die, $d$, along its inner lower edge, standing parallel with the axis of the can-holder, and projecting below the flat face end of the other jaw.

The lower die, $c$, is carried by a bar, Q, fitted to have a sliding movement in a dovetailed groove, $a$, formed in the top of the can-holder L, which is a cylindrical body projecting from the front of the standard, to which it is firmly secured, as shown in Fig. 3. In my said patent this die is carried by a horizontal bar adapted to have a limited vertical movement upon inclined planes, and for operation partly by hand and partly by an eccentric on the cam-shaft. My present improvement contemplates an automatically-sliding die-carrier having a die adapted to co-operate with the die $d$ of the jaw-clamp K, and a groove, $b$, adapted to co-operate with the plunger or hammer M, the said die-carrier being operated to present its die $c$ to form the crimped seam, as in Figs. 5 and 8, and then drawn inward by the slide to clear the die $c$ of the can-body and leave the crimped seam over the groove $b$ in said die-carrier to receive the action of the plunger-hammer, as in Figs. 6, 19, and 20. The groove $a$ is longitudinally channeled through the can-body holder L and its support L', and its dovetail form holds the die-carrier or slide-bar in place.

The die-carrier or slide-bar Q has the groove $b$ on top, open at its front outer end and closed at its inner end, and has a depth and width sufficient to receive the lapped metal of the seam when forced down therein by the hammer. The length of the groove should be a little greater than twice the length of the can-blank, and the die $c$, which has a length half that of the groove $b$, joins the inner end of the latter and rises from one side of the groove in position to enter the space between the jaws and lap with the jaw-die $d$, when the dies $c$ and $d$ are brought together to crimp the lapped ends of the metal between them, as in Fig. 5. The die $c$ is preferably separate and secured in a recess in the bar Q, so as to be easily renewed when required. The groove $b'$ alongside of the die is wide enough to receive the lapped crimped ends which stand vertically between the flat faces of the dies, so, as in Fig. 5, that the under lapped end has an under bend and the outer lapped end has an over bend, causing the lapped crimp to turn under when the plunger is depressed upon the over bend in the wider end part, $b$, of the groove, which extends from the outer end of the die to the outer end of the bar, as shown in Figs. 6 and 10.

The two separate operations—viz., crimping the lapped ends and turning and compressing the crimp—are effected, the first over the die $c$ and within the groove $b'$ along its side and the second within the groove $b$ of the bar, said groove being made wider from the outer end of the die to the outer end of the bar, and of a length equal to that of the can-blank. For this purpose the bar Q is caused to have a positive intermittent sliding movement controlled so that the outward movement will bring the die $c$ in proper relation to the can-blank holder L and to the jaw-die $d$ to form the crimp, as shown in Fig. 18, while the inward movement of the bar will bring its groove $b$ in exactly the same position from which the die $c$ was moved to receive the compressing action of the plunger M, as shown in Fig. 19, to complete the seam. In this position the outer end of the die is back of the inner edge of the can-blank and of the shoulder $e$ at the base of the can-holder L, so that the outward movement of the slide-bar Q will cause the outer end of the die to strike the inner edge of the can-body and eject or push it from the holder, as in Fig. 1. The can-blank is placed upon the holder L against the shoulder $e$, and the movement of the die-carrier or slide-bar is controlled so that its inward stroke will carry the outer end of the die back of said shoulder $e$, and the outward stroke of the bar will carry the outer end of the die in line with the outer end of the can-holder. By this construction and arrangement of the can-holder and the intermittently-sliding grooved die-carrier, the seam is formed by the co-operation of the clamping-jaws, the dies, the grooved die-carrier, and the plunger, and the can-blank is ejected from its holder L by the outward movement of the die, which acts as a pusher. The die-carrier is operated from the cam-shaft by the connections shown in Figs. 1 and 3.

Mounted in bearings at the rear of the standard B is a horizontal shaft, T, which is connected by a vertical arm, S, with the rear end of the die-carrier or slide-bar Q by links R. At the end of the shaft is a depending rock-arm, U, connected at its lower end to the standard B by a spring, V, which constantly tends to force the arm S and its connecting die-carrier forward. The lower end of the rock-arm U has a slot, $u$, and is connected by a link, $V^2$, to the lower end of the vertical rock-arm W, pivoted to the side of the standard at $w$ and extending forward and curving over and downward in front of the cam-shaft, so that the two ends of the rock-arm will embrace a cam-wheel, X, on the end of the driving-shaft. Each end of this rock-arm W has a roller, $g$, the pivot-pins of which are adjustably secured in slots, to prevent binding and allow them to work freely against the cam-wheel. The cam-shaft is driven by belt from the pulley which has a clutch-connection with the shaft controlled by the treadle, as in my said patent. As the cam-wheel is revolved the rock-arm W is oscillated by the alternate action of the cam $z$ on cam-wheel X upon the rollers $g$, and the intermittent movement of the rock-arm W is communicated to the arm S, giving an intermittent movement to the die-carrier properly timed with the action of the upper dies and with the action of the hammer.

Provision is made for giving a longer or shorter stroke to the die-carrier to suit different lengths of can-bodies by adjusting the connection of the link $V^2$ with the rock-arm U in the slot $u$ of the latter. The adjustment of the link to bring its end at the lower end of the slot will lengthen the stroke of the rock-arm and give a greater stroke to the die-carrier for long can-bodies, while for shorter can-bodies the end of the link is set at the top of the slot so as to lessen the stroke of the die-carrier, and for this purpose the die $c$ and the groove $b$ extending therefrom should each be of a length equal to that of the longest can-blank to be seamed.

To utilize the can-holder for different diameters and shapes of can-bodies, I employ supplemental holders $L^2$, of cylindrical or square form, having an opening, $L^3$, eccentrically made to allow them to be slipped over and fitted upon the smaller holder L, and a surface opening, $L^4$, Fig. 17, to allow them to be fitted over the die-carrier, as shown. These supplemental holders are slipped on like sleeves and secured by a screw.

Provision is made for determining the width of the seam and for adjusting the width to suit different sizes of cans by means of a detent-gage, H, consisting of an arm pivoted to the front side of the standard upon a stud, $s$, so that its lower end will be just below and outside of the die $d$, and held against the edge of the overlap of the can-blank, as in Fig. 4. The detent is held by a spring, $t$, and a set-screw, $m$, passing through a threaded projection of the standard, and the lower outer edge of the jaw is rounded or beveled to freely press the detent-gage aside when the die $d$ is in contact with the overlap. By adjusting the screw in or out the detent-gage will be set accordingly to make a wider or narrower seam. The lap of the seam may, however, be gaged by forming the lower die, $c$, with a shouldered offset, $c'$, just below its forming-edge, as shown in Fig. 14, against which the under lap rests. In this case the die itself will form the gage-detent for the under lap of the seam. Instead of having the upper die, $d$, carried by the clamping-jaw, it may be carried by a lever, K', pivoted to the standard and operated by an eccentric, $N^2$, on the driving-shaft, and adjusted by right and left hand screw-connections $P^2$ with the eccentric-strap $N^3$ to suit different thickness of metal. In this construction the lever-die $d$ is made in the form of an inverted V, and the lower die is of corresponding form. The upper die-jaws are dispensed with and the plunger or hammer is operated by the slide E by direct attachment to the strap $N^4$ of the eccentric P.

It will be understood that the dovetail form in cross-section of the die-carrier is important to prevent it from being raised from its guiding-groove in the can-holder by the action of the lever-arm S.

The upper die-jaws and the plunger being in their raised positions, the can-blank is placed upon the holder, and the lapped edges properly adjusted against the gage-detent over the lower die, the carrier of which is at the limit of its forward stroke, as in Fig. 18. The clutch is then engaged and the mechanism is operated, causing the upper die-jaws to descend upon the lapped ends and crimp the metal over the lower die into the groove $b'$ of the carrier-bar Q by the side of the die, as in Figs. 5 and 18. Immediately after this the die-jaws rise and the die-carrier commences to move inward, so as to carry the die $c$ from beneath and free of the crimped seam and bring the groove $b$ in the carrier-bar Q beneath the crimped seam, while at the same time the plunger-hammer commences to descend upon the crimped seam, and, turning the crimp over toward the groove, presses it therein, so as to form a tight flat seam, as shown in Figs. 6, 19, and 20. As soon as the seam is thus completed the hammer rises and the die-carrier is moved forward with the front end of the die $c$ against the edge of the can-body, thereby ejecting or shoving it from the holder L, leaving the die $c$ in position to receive another can-blank for a repetition of the operation, as shown in Fig. 21.

The clamping jaw-dies are adapted for adjustment to suit different thickness of metal, and to give their proper movement in relation to the lower die.

After the crimp is formed, as in Fig. 5, the die-jaws rise slightly to release their pressure upon the die-bar, to allow the latter to be drawn in, as stated, the die-jaws meanwhile holding the laps of the crimp together. After the die-bar is fully withdrawn, the die-jaws then rise out of the way to allow the hammer to turn and close the seam. The organization and combination of seam-forming devices which I have described are adapted to form a four-ply seam, as distinguished from such machines in which the seam is formed with a six-ply lap, as shown in Fig. 9.

I claim—

1. The combination, in a seaming-press, of a can-holder, the intermittently-sliding bar Q, having the groove $b$ on its upper surface, and a die rising from one side of said groove, with the clamping-jaws K K, one of which is provided with a die, $d$, the hammer M, and means for operating the co-operating seam-forming parts, substantially as described.

2. The combination, in a seaming-press, of the can-holder L, having a longitudinal groove of dovetail form in cross-section, with the bar Q, adapted to slide in said groove, having the top groove, *b*, open at the end of said bar, and a die, *c*, arranged at the closed inner end and rising from one side of said groove, the upper jaw-dies, K K, the hammer M, means for intermittently operating the die-carrier Q, and means for operating the jaw-dies and the hammer in relation to said sliding die-carrier, substantially as described, for the purpose specified.

3. The combination, with the die-jaws K K *d* and a hammer, M, of the die *c*, the die-carrying bar Q, having a groove, *b b'*, the fixed holder L, having the shoulder *e*, and the operating connections for said dies, hammer, and die-bar, the several parts being constructed and arranged to operate automatically, to cause the lower die to be carried outward beneath the upper dies to effect the crimp of the seam, and to cause said lower die to be carried inward from under the crimped seam to bring in place the grooves *b*, within which the crimped seam is turned and compressed, and the seamed article to be ejected by the return outward movement of the lower die to its first position.

4. A sheet-metal-seaming press provided with a vertically-reciprocating crimping-die, a horizontal die, a horizontal intermittently-sliding carrier-bar therefor, having the open-ended groove *b b'* in line with said die, and a seaming-hammer arranged to operate in connection with the open-ended section *b* of said groove, substantially as and for the purpose specified.

5. A sheet-metal-seaming press provided with a vertically-reciprocating crimping-die, a horizontal intermittently-reciprocating die, *c*, its carrying-bar Q, having the open-end groove *b b'* in line with said die, a grooved shouldered holder, L *e*, for said bar, and a seaming-hammer, the said horizontal die being arranged back of the open end of said groove-section *b* a distance equal to the length of said horizontal die, and the latter having a movement sufficient to bring its outer end back of the shoulder *e* of the die-bar holder, whereby the said die *e* is caused to automatically eject the seamed article from the can-holder, substantially as herein set forth.

6. The combination of the die *c* and its horizontal sliding carrier Q, having the open-ended groove *b b'* in line with said die, with the jaws K K, one of which has the die *d* arranged to operate within said groove-section *b'*, and a hammer arranged to operate with the groove-section *b* in front of said die, substantially as and for the purpose specified.

7. The combination of the die *c*, having a groove, *b*, at one side of its base, with the jaws K K, one of which has the die *d* arranged to operate within said groove, and means to intermittently reciprocate said die *c* horizontally, substantially as described, for the purpose specified.

8. The combination of the die *c*, having groove *b* at one side of its base, with the jaws K K, one of which has the die *d* arranged to operate within said groove, and a detent-gage, H, substantially as described, for the purpose specified.

9. The combination, with the vertically-operating jaw-dies, seaming-hammer, and can-holder, of the grooved sliding die-carrier Q and means for giving it a horizontal intermittent movement, consisting of the lever S, rock-arm U, link $V^2$, pivoted arm W, and cam-wheel X *z*, embraced by rollers carried by said pivoted arm, substantially as herein set forth.

10. The combination, with the vertically-operating jaw-dies, seaming-hammer, and can-holder, of the grooved sliding die-carrier Q, means for giving it a horizontal intermittent movement, and means for giving it a longer or shorter stroke, substantially as described, for the purpose specified.

11. In combination, in a seaming-press, the jaw-dies K K, the grooved slide-bar Q, having die *c*, the can-holder L, the seaming-hammer M, lever S, rock-arm U, having slot *u*, link $V^2$, pivoted arm W, having rollers *g*, cam-wheel X *z*, and spring V, all constructed and arranged for operation substantially as herein set forth.

12. The combination, with the crimping-dies *c d* and the groove *b*, of an adjustable detent-gage, substantially as described, for the purpose specified.

13. The combination, in a seaming-press, of the crimping-dies and groove *b b'* with the can-holder L and the supplemental holder $L^2$, substantially as described, for the purpose specified.

14. The combination, with a retaining grooved can-holder, of a longitudinally-sliding grooved die-carrier carried by said holder, and suitable seam crimping and compressing devices, substantially as described.

15. The slide-bar Q, having the groove *b b'*, and the separate crimping-die arranged at the inner end of said groove, combined with a can-holder and suitable crimping and compressing devices, substantially as herein set forth.

16. The combination, in a seaming-press, of the crimping-dies and the groove *b b'* with the cylindrical can-holder having the receiving-crimping-die carrier, and a supplemental holder having an eccentric opening adapted to fit over the said cylindrical holder, and a side opening adapted to fit over the said die-carrier, substantially as herein set forth.

17. In an organized machine for seaming can-bodies, the can-holder provided with a retaining-groove, in combination with a horizontally-reciprocating die-carrier bar, clamping die-jaws operating therewith, and a finishing-hammer, with suitable means for operating the parts, substantially as set forth.

In testimony whereof I have hereunto set my hand in the presence of two subscribing witnesses.

WM. J. GORDON.

Witnesses:
A. E. H. JOHNSON,
J. W. HAMILTON JOHNSON.